UNITED STATES PATENT OFFICE.

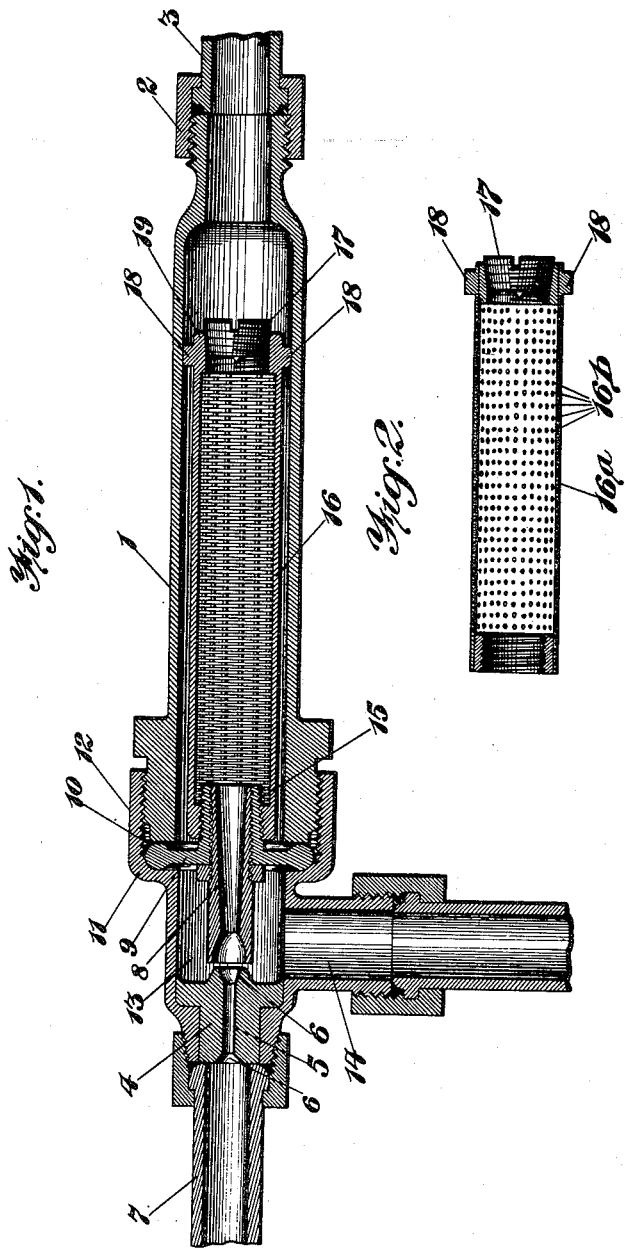

JOHN B. VOGELSANG, OF WEBSTER GROVES, MISSOURI.

PROCESS FOR COMBINING AND EMULSIFYING TWO OR MORE LIQUIDS.

1,152,456.  Specification of Letters Patent.  Patented Sept. 7, 1915.

Original application filed June 8, 1914, Serial No. 843,668. Divided and this application filed October 10, 1914. Serial No. 866,128.

*To all whom it may concern:*

Be it known that I, JOHN B. VOGELSANG, a citizen of the United States, residing at Webster Groves, in the county of St. Louis, State of Missouri, have invented certain new and useful Improvements in Processes for Combining and Emulsifying Two or More Liquids, of which the following is a specification, this application being a division of that filed June 8, 1914, Serial No. 843,668.

This invention relates primarily (but not exclusively) to processes of producing cream by the intimate admixture of skimmed milk or milk powder with butter fat or an oil of suitable character; the object of the invention being to afford a simple and effective process by which the desired result can be rapidly attained.

In the accompanying drawing, wherein like numerals refer to like parts throughout the several views, Figure 1 is a longitudinal sectional elevation depicting the interior of the preferred device for carrying out the process and Fig. 2 is a detail sectional view depicting a modification of one of the parts shown in Fig. 1.

Referring to the drawing, numeral 1 denotes the body of a sectional tube one end of which is coupled as at 2 to a pipe 3 leading to a cooling vat (not shown) and whose opposite extremity is substantially closed by a plug 4 through which is projected an aperture 5 having flaring ends 6 constituting a nozzle. One of the extremities of said nozzle communicates directly with a pipe 7 through which air or steam is supplied under pressure and disposed adjacent the opposite end of the nozzle is a tube 8 which is supported by an annular member 9 having a rounded edge as at 10 for which a seat is provided as at 11 in the coupling 12. It will be noted that a portion of tube 8 projects within a chamber 13 and that a suction-pipe 14, whose lower end (not shown) is submerged in the mixture to be emulsified, communicates directly with said chamber.

Detachably secured as at 15 upon the inner end of tube 8 is an emulsifying chamber 16, the same being preferably formed of fine woven wire and closed at one end by a removable screw-plug 17. By way of modification I may employ the finely perforated chamber 16ª shown in Fig. 2 in lieu of the wire-mesh chamber of Fig. 1 and in either case the free extremity of the emulsifying chamber is supported against the inner surface of tube 1 by means of lugs 18 formed integral with the metal band 19 in which plug 17 is seated.

Having thus pointed out the construction of the preferred form of apparatus, the process involved may be described as follows:— The extremity of pipe 14 being submerged in the vessel containing the mixture which it is desired to emulsify and the said mixture having been agitated and heated, steam or hot air under high pressure is then turned into pipe 7 and on passing through nozzle 5 serves to draw said mixture into chamber 13 whence it is forced through tube 8 into chamber 16. On reaching the emulsifying chamber the mixture is first projected against its closed end and the impact is such as to disrupt the fat globules and force the mixture backward against the inner surface of said chamber in the direction of tube 8, whereby a churning effect is produced which serves (especially when the woven wire chamber is used which presents a rough surface) to further disrupt the fat globules while thoroughly mixing the substances employed. The mixture having undergone this treatment, it is next forced through the wire-mesh of which the preferred emulsifying chamber is formed, or, if the modification be employed, through the apertures 16ᵇ shown in Fig. 2, this resulting in finely dividing the fat globules and so thoroughly commingling the substances as to produce cream which compares most favorably with the natural article.

What I claim as new and desire to secure by Letters-Patent is:—

1. The method of combining and emulsifying two or more liquids which comprises the propulsion thereof by aid of a fluid under pressure into a chamber from which their egress is impeded.

2. The method of combining and emulsifying two or more liquids which comprises the propulsion thereof by aid of a steam-jet into a chamber from which their egress is impeded.

3. The method of combining and emulsifying two or more liquids which comprises the propulsion thereof by aid of a steam-jet through the perforate walls of a chamber.

4. The method of combining and emulsifying two or more liquids which comprises the propulsion thereof by aid of a steam-jet through the perforate walls of a chamber having a roughened interior surface.

5. The method of combining and emulsifying two or more liquids which comprises the projection thereof in a stream under pressure against a solid surface disposed at one end of a perforate chamber and the subsequent propulsion of the substances through the perforations of said chamber.

6. The method of combining and emulsifying two or more liquids which comprises the projection thereof by aid of a steam-jet against a solid surface disposed at one end of a perforate chamber and the subsequent propulsion of the substances through the perforations of said chamber.

7. The method of combining and emulsifying two or more liquids which comprises the projection thereof in a stream under pressure against a solid surface disposed at one end of a perforate chamber having a roughened interior surface and the subsequent propulsion of the substances through the perforations of said chamber.

8. The method of combining and emulsifying two or more liquids which comprises the projection thereof by aid of a steam-jet against a solid surface disposed at one end of a perforate chamber having a roughened interior surface and the subsequent propulsion of the substances through the perforations of said chamber.

JOHN B. VOGELSANG.

Witnesses:
B. NIENSAUK,
M. A. HENEGHAN.